United States Patent [19]
Reynolds et al.

[11] Patent Number: 5,963,867
[45] Date of Patent: Oct. 5, 1999

[54] GRAPHIC TOOLS FOR INTERACTIVELY PLANNING A WIRELESS NETWORK

[75] Inventors: Matthew C. Reynolds; Sheila M. Reynolds, both of Encinitas, Calif.

[73] Assignee: Qualcomm Inc., San Diego, Calif.

[21] Appl. No.: 08/515,772

[22] Filed: Aug. 16, 1995

[51] Int. Cl.$^6$ .................................................. H04B 17/00
[52] U.S. Cl. .......................... 455/457; 455/67.6; 455/67.7
[58] Field of Search .................................. 455/422, 423, 455/424, 425, 446, 447, 448, 449, 456, 457, 62, 63, 67.1, 67.6, 67.7, 517, 524; 342/357, 450, 451, 454, 457; 395/183.08, 183.09

[56] References Cited

U.S. PATENT DOCUMENTS

| | | | |
|---|---|---|---|
| 4,881,082 | 11/1989 | Graziano | 342/432 |
| 5,293,640 | 3/1994 | Gummar et al. | 455/33.1 |
| 5,307,510 | 4/1994 | Gummar et al. | 455/67.1 |
| 5,491,644 | 2/1996 | Pickering et al. | 455/67.6 |
| 5,508,707 | 4/1996 | LeBlanc et al. | 455/456 |
| 5,602,903 | 2/1997 | LeBlanc et al. | 455/456 |
| 5,710,758 | 1/1998 | Soliman et al. | 455/67.6 |

OTHER PUBLICATIONS

"Cellular System Design Using the Expansion Cell Layout Method", *IEEE Transactions on Vehicular Technology*, by J. Douglas Wells, vol. VT–33, No. 2, May 1984, pp. 58–66.

"C 900–An Advanced Mobile Radio Telephone System with Optimum Frequency Utilization", *IEEE Transactions on Vehicular Technology*, by Karl Kammerlander, vol. VT–33, No. 3, Aug. 1984, pp. 205–213.

"Mobile Location Using Signal Strength Measurements in a Cellular System", *IEEE Transactions on Vehicular Technology*, by Masher Hatter et al., vol. VT–29, No. 2, May 1980, pp. 245–252.

"The Cellular Concept", *The Bell System Technical Journal*, by V. H. Mac Donald, vol. 58, No. 1, Jan. 1979, pp. 15–41.

"Efficient Hand–off Policy Without Guard Channels for Mobile Radio Telephone Systems", *Electronics Letters*, by P. Billet et al., May 25, 1989, vol. 25 No. 11, pp. 700–701.

"Priority Oriented Channel Access for Cellular Systems Serving Vehicular and Portable Radio Telephones", *IEEE Proceedings*, by D. Hong, vol. 136, Pt. I, No. 5, Oct. 1989, pp. 339–346.

"Multiple Criteria for Hand–Off in Cellular Mobile Radio", *IEEE Proceedings*, by D. Munoz–Rodriguez, vol. 134, Pt. F, No. 1, Feb. 1987, pp. 85–88.

"A New Channel Assignment Scheme in Demand–Assignment Radio Communications System", *Electronics and Communications in Japan*, by Jun Tajima, Part 1, vol. 72, No. 8, 19889, pp. 41–50.

(List continued on next page.)

*Primary Examiner*—Thanh Cong Le
*Attorney, Agent, or Firm*—Russell B. Miller; Christopher O. Edward; Brian Edmonston

[57] ABSTRACT

A method and apparatus for providing network planning information in an interactive manner is described. A user selects a planning tool and inputs a selection point. If a line of sight cursor tool has been selected, a set of points on a display are set indicating a line of sight exists from those points to the selected point. If a path loss cursor tool has been selected a set of points on a display are set indicating a path loss to the selection point less than a certain threshold. Alternatively, a set of point on the display are set to various colors or shades indicating a range of path loss amounts to the selected point. In the preferred embodiment the invention incorporates the use of a computer system.

7 Claims, 13 Drawing Sheets

OTHER PUBLICATIONS

"Traffic Model and Performance Analysis for Cellular Mobile Radio Telephone Systems with Prioritized and Nonprioritized Handoff Procedures", *IEEE Transactions on Vehicular Technology*, by Daehyoung Hong et al., vol. VT–35, No. 3, Aug. 1986, pp. 77–92.

"CDMA Radio Network Planning", *IEEE*, Radio Systems Department GTE Laboratories, by Mark' Wallace et al. Sessions 1.3 & 1.4, pp. 62–67.

Brochure Excerpt, from LCC Inc., referencing CellCAD, 2 pages.

Brochure Excerpt, from CNET, referencing Wings (Wireless Network Graphics System), 2 pages.

Excerpt from U.S. Patent Official Gazette, Sep. 29, 1987, p. 2631.

Excerpt from U.S. Patent Official Gazette, Jun. 2, 1987, p. 608.

Excerpt from U.S. Patent Official Gazette, Feb. 2, 1988, p. 403.

IEEE Article, entitled "Hand–Off Procedure for Fuzzy Defened Radio Cells", by D. Munoz–Rodriguez et al, Sep. 1987, pp. 38–44.

Article, entitled "Efficient Spectrum Utilization for Mobile Radio Systems Using Space Diversity", by Y.S. Yeh et al, of Bell Laboratories, pp. 12–16.

GRAPHIC TOOLS FOR INTERACTIVELY PLANNING A WIRELESS NETWORK

BACKGROUND OF THE INVENTION

I. Field of the Invention

The present invention relates to wireless communication network planning tools. More particularly, the present invention relates to a novel and improved interactive graphic tool for planning a wireless network.

II. Description of the Related Art

Wireless network providers have an increasing need for wireless network design planning tools. A conventional wireless network planning tool is typically implemented in software designed to run on a computer system having a graphic display terminal. Generally, existing network planning tool software assists a network planner in designing a wireless network by graphically providing wireless communication transmission performance information. The wireless communication network most often designed using wireless network tools are cellular telephone networks.

Most network planning tools require the network planner to suggest a particular wireless network configuration and input that configuration into the network planning tool. In the case of a cellular wireless network the configuration is comprised of numerous "cell sites" or base stations having a specific geographic location in the communication service area. Proposing a configuration requires the planner to generate all base station Cartesian coordinate locations and input them input the network planning tool. Once a configuration has been proposed, a network simulation may be performed using the network planning tool. The results of that simulation are displayed providing the network planner with an indication of the performance of the proposed configuration.

Running a complete wireless network simulation using a conventional planning tool is time consuming and can therefore be ineffective because the network planner must wait a significant period of time to receive any feedback regarding the proposed configuration. Such "batch mode" processing, however, is necessary because of the complexity involved with performing a complete network simulation. Conventional computer are simply not powerful enough to perform such simulation in real time. The result is that each modification to a network design requires that the entire simulation be reexecuted. It would be beneficial to have at least some immediate communication of performance results as base station locations are selected, with the measurement of this performance being within the capabilities of conventional computer systems. Therefore, an interactive network planning system providing interactive tools that allows a network planner to receive rapid feedback regarding the configuration of various portions of a wireless network would be highly desirable.

SUMMARY OF THE INVENTION

The present invention is a novel and improved method and apparatus for providing network planning information in an interactive manner. A user selects a planning tool and inputs a selection point. If a line of sight cursor tool has been selected, a set of points on a display are set indicating a line of sight exists from those points to the selected point. If a path loss cursor tool has been selected a set of points on a display are set indicating that path loss to the selection point is less than a certain threshold. Alternatively, a set of point on the display are set to various colors or shades indicating a range of path loss amounts to the selected point. In the preferred embodiment the invention incorporates the use of a computer system.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

The preferred embodiment of the present invention provides many advantages over existing wireless network planning tools. The present invention provides a network planner with novel and useful interactive wireless network planning tools. A brief comparison of the present invention with conventional network planning tools should make the advantages of the present invention apparent.

Figure 1:
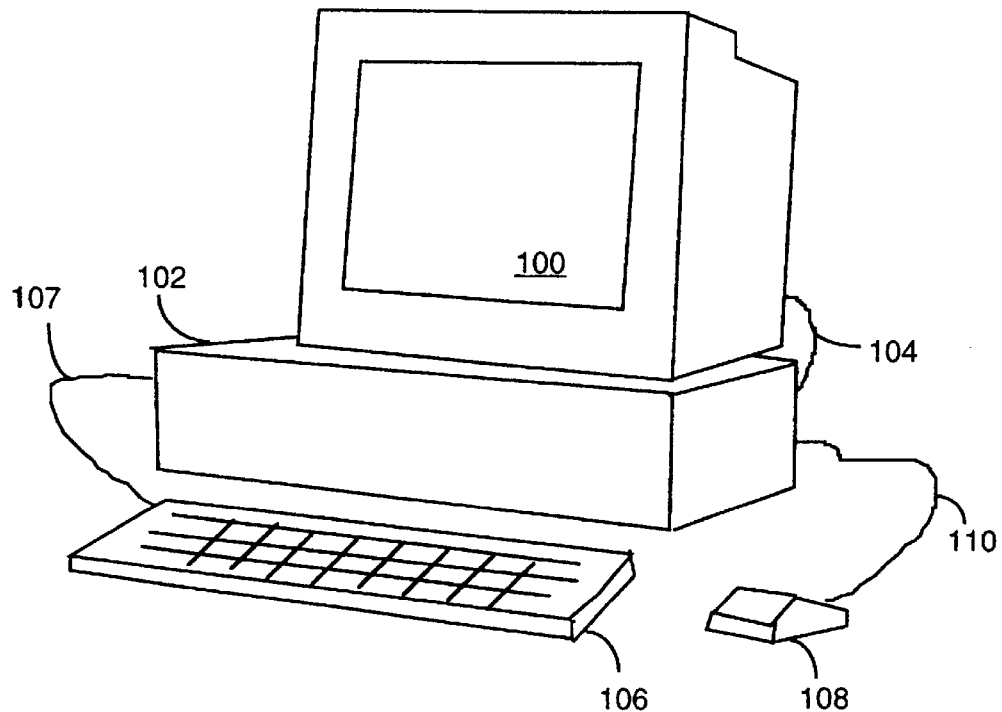
FIG. 1 is an illustration of a computer system configured in accordance with one embodiment of the invention.

FIG. 1 is an illustration of a computer system used to implement the present invention in accordance with the exemplary embodiment described herein. Display screen 100 is coupled to computer 102 via cable 104 and in the preferred embodiment of the invention incorporates the use of a cathode ray tube display mechanism, however, the incorporation of other display mechanisms will be apparent including the use of transistor based flat panel displays or image projection devices. Display screen 100 is divided into "pixels" that are set to various colors by computer 102 in order to display an image. In the preferred embodiment of the invention the pixels are arranged in an X–Y coordinate system, and are square or rectangular in shape. Keyboard 106 is coupled to computer 102 via cable 107, and mouse 108 is coupled to computer 102 via cable 110. Keyboard 106 and mouse 108 generate electronic signals in response to manipulation by a user that are input to computer 102. It will be apparent to one skilled in the art that various other input mechanism may be used in lieu of or in addition to mouse 108 and keyboard 106 including pen and tablet devices, track ball units, and speech recognition systems.

Figure 2:
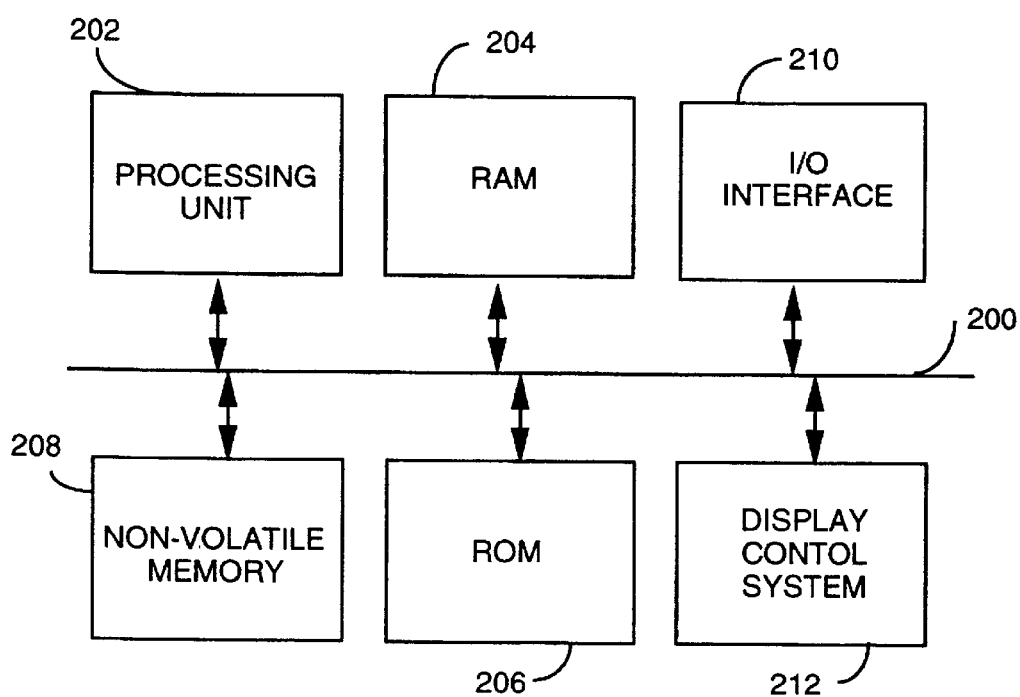
FIG. 2 is a block diagram of a computer system configured in accordance with one embodiment of the invention.

FIG. 2 is a block diagram of computer 102 when configured in accordance with one embodiment of the invention. Bus 200 couples together processing unit 202, random access memory (RAM) 204, read only memory (ROM) 206, non-volatile memory 208, input-output (I/O) interface 210, and display control system 212. Using digital instructions stored in non-volatile memory 208, and RAM 204, processing unit 202 processes digital data also stored in non-volatile memory 208 and RAM 204, as well as received from I/O interface 210, which is coupled to keyboard 106 and mouse 108 of FIG. 1, as well as any other input devices. As a result of this processing, processing unit 202 generates data that is useful for planning a wireless network and that is provided to display control system 212 which in turn causes the data to be displayed on display screen 100 of FIG. 1 so that a user may view this useful data. In the preferred embodiment of the invention, processing unit 202, random access memory (RAM) 204, read only memory (ROM) 206, non-volatile memory, 208, input-output (I/O) interface 210, and display control system 212, incorporate the use of semiconductor based integrated circuits. Non-volatile memory 208 also incorporates the use of hard disk memory although other storage means well known in the art may be substituted. Additionally, the data and instructions are preferably comprised of stored electronic charges, voltages, or a combination thereof, as well as electromagnetic or optical particles arraigned in a predetermined and controlled fashion.

The data stored in non-volatile memory includes an electronic representation of geographic and other environmental information about a specific market area over which simulation of the operation of a cellular telephone system is to be performed. In the preferred embodiment of the invention this data is stored as altitude or height information (terrain data) associated with an evenly spread set of X–Y coordinates referred to as "bins". Additionally, the stored data may include an electronic representation of the layout of a cellular telephone system. A variety of methods for generating both the terrain data area and cellular network data will be apparent including measuring existing geographical areas and cellular telephone systems or manual entry using keyboard 106 and mouse 108. Additionally, a preexisting electronic representation of a cellular telephone system can also be saved and imported into computer system 99 via a storage disk or network connection. During operation of the network planning system the software instructions stored within the memory system cause the processing system 102 to generating images on display screen 100 using the data stored in the memory system as well as the electronic signals generated using mouse 108 and keyboard 106. Instructions and data may also be provided to computer 102 and processing unit 202 via a network connection, the use of which is also well known in the art.

Figure 3:
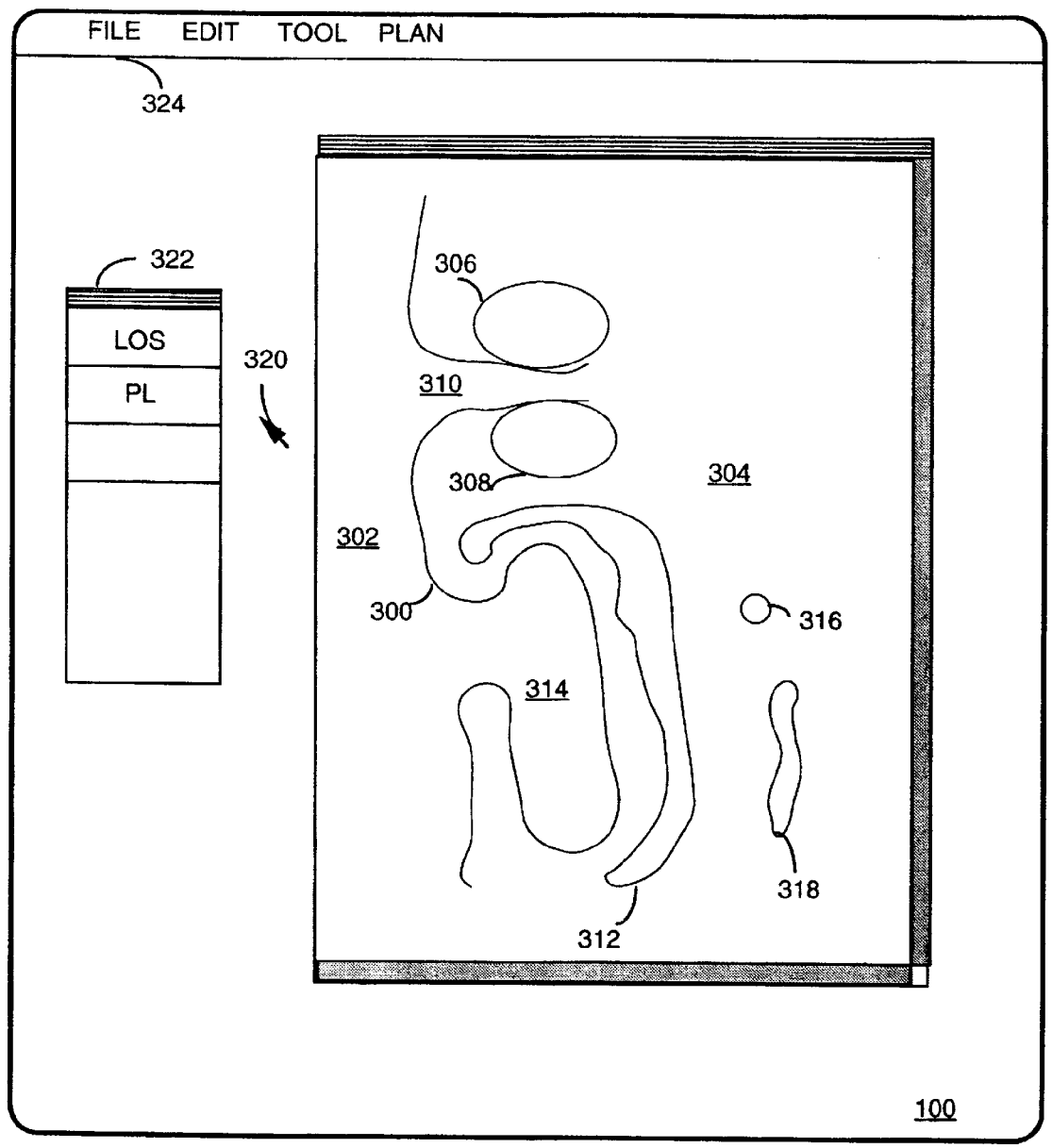
FIG. 3 is an illustration of an image displayed in accordance with one embodiment of the invention.

FIG. 3 is an illustration of an exemplary image displayed on display screen 100 using the terrain data stored in non-volatile memory 208 in accordance with one embodiment of the invention. Shore line 300 indicates the separation between water body 302 and land area 304. Hills 306 and 308 are displayed on either side of inlet 310, and ridge 312 surrounds bay region 314. Hill 316 and canyon 318 are located to the right of ridge 312. Pointing cursor 320 can be moved across the display using mouse 108 of FIG. 1 and is used to select either the path loss cursor (PL) or the line of sight cursor (LOS) tool from tool palette 322 via depression of a selection button on mouse 108 (not shown). Additionally, pointing cursor 320 is used to make selections from menu bar 324 the use of which is well known in the art. It should be understood that the geographic landscape shown is only an example, and the display of other market areas are consistent with the operation of the present invention. For example a market area that did not have a body of water, or with a fewer or greater number of hills could also be displayed. Additionally, the market area displayed could correspond to an actual geographic region or could be merely a fictitious region, or a combination thereof.

Figure 4:
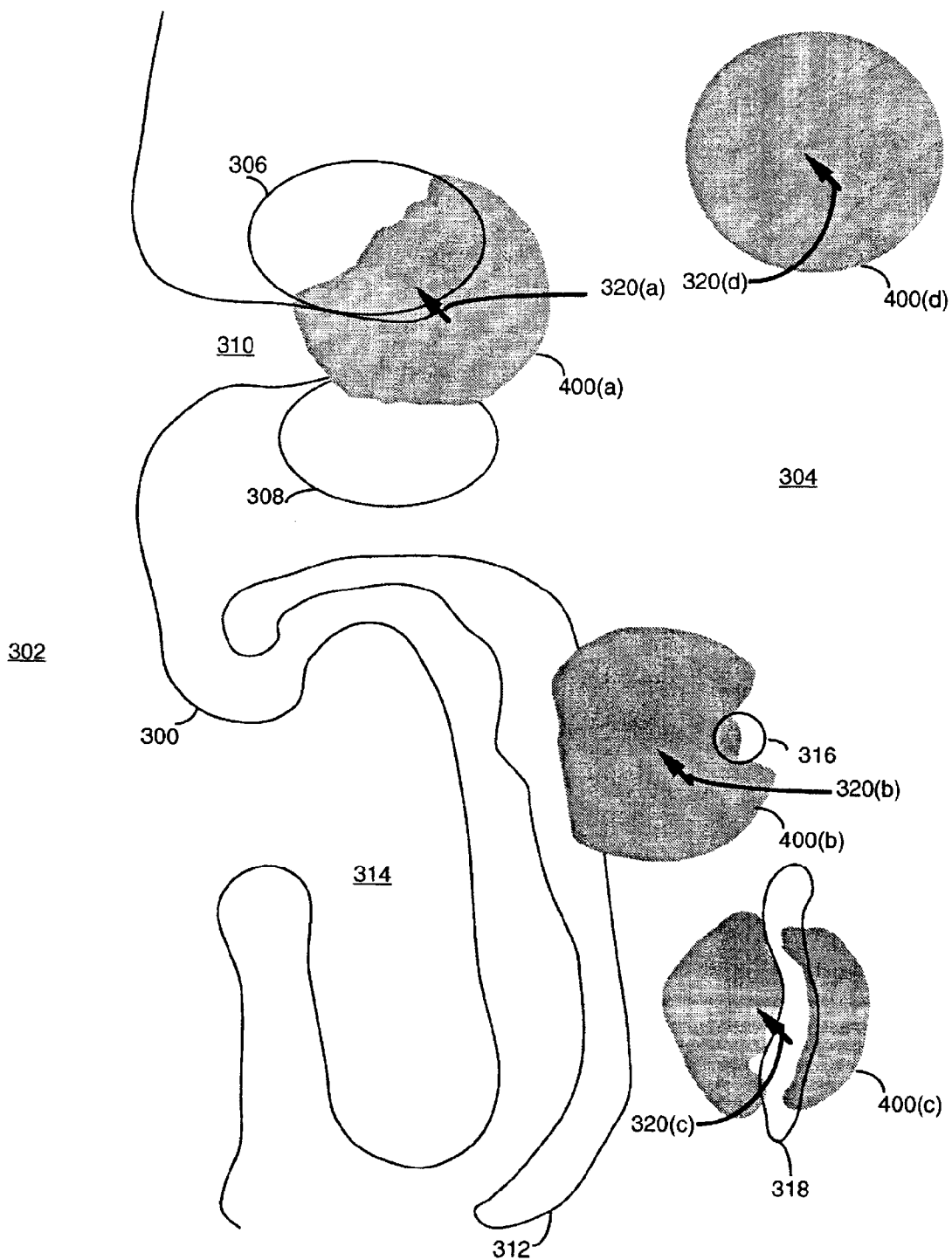
FIG. 4 is an illustration of the use of the line of sight cursor in accordance with one embodiment of the invention.

FIG. 4 is an illustration of an image displayed on display screen 100 in accordance with the use of a line of sight cursor tool. Pointing cursors 320(a)–(d) are located within line of sight cursors 400(a)–(d). Four line of sight cursors 400 and pointing cursors 320 are shown in order to provide multiple examples of the use of line of sight cursor 400, however, the preferred embodiment of the invention will only allow the display of one line of sight cursor 400 at any particular time. The display of multiple line of sight cursors 400 is not inconsistent with the present invention, however. The point of selection is made and the line of sight cursors 400 generated by placing pointing cursor 320 at the desired selected location using mouse 106 and indicating the selection using a selection button located on mouse 106, the use of which is well known in the art. Once the selection point is established, a line of sight cursor 400 is generated by setting a set of pixels from which a direct line of sight exists to the point of selection within a given radius of a point of selection. That is, each pixel within a certain radius that corresponds to a location from which a path unobstructed by land to the selected location exists is set to a particular color that is different from the background color. It should be noted that the line of sight cursors 400 are shown as a gray or checkered area in the figure, however, this is only done for ease of drawing and that every pixel having a direct line of sight to the selected location will be set in the actual implementation. This is also the case for the path loss cursor illustrated below.

Line of sight cursor 400(a) illustrates the generation of a line of sight cursor with the selection point made at the side of hill 306. The corresponding line of sight cursor 306 has the pixels on the front side of hill set, because any line from the selection location to the back side of hill 306 would necessarily pass through hill 306. Therefore, the back of hill 306 can not be seen from the selected location. Line of sight cursor 400(b) illustrates the generation of a line of sight cursor between hill 316 and ridge 312. As can be seen, the pixels on the right side of ridge 312 and in close proximity to the point of selection are set while the pixels on the left side are not. The pixels on the left side of the ridge 312 can not be seen from the point of selection. Additionally, the pixels on the right side of hill 316 are not set, which the pixels to the right of hill 316 are. Once again the locations of the pixels on the right side of hill 316 cannot be seen from the point of selection. Line of sight cursor 400(c) illustrates the generation of a line of sight cursor in close proximity to canyon 318. As can be seen, the pixels within canyon 318 are not set indicating that the corresponding locations can not be seen from the point of selection indicated by cursor 320(c), while the points to the right and beyond canyon 316 are set indicated that a direct line of sight does exist. The line of sight to the various locations surrounding the point of selection indicated by pointing cursor 320(d) are indicated by line of sight cursor 400(d). Since pointing cursor 320(d) is located in a relatively flat area the entire set of pixels within a given radius are set, thus generating a circular line of sight cursor.

A line of sight cursor 400 provides an indication of the locations that can be seen within a given radius of a selection point. The ability to see a location from the selected location provides an indication of the set of locations that can receive a radio frequency signal transmitted from the selected location. Additionally, the ability to see a location indicates that a radio frequency signal will arrive at the selected location if transmitted therefrom at sufficient strength. This provides a preliminary indication to the user as to the coverage area a base station placed at the selected location will be able to provide, or the locations available to place a base station in order to cover a particular location. Since the computations involved with generating a line of sight cursor are significantly less than that involved with performing a full simulation, the line of sight cursor can be generated in real time to provide an indication as to the usefulness of a particular spot for placement of a base station, or the difficulty with which cellular telephone service can be provided to a particular spot. This allows problems with a proposed positioning of a base station within a proposed cellular telephone system configuration to be detected without having to perform a complete simulation of the operation of the cellular telephone system.

Figure 5:
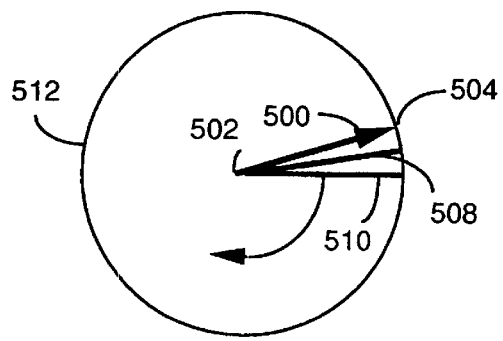
FIG. 5 is an illustration of the order in which the data associated with a line of sight cursor are processed.

FIG. 5 illustrates the order in which the terrain and pixels of a line of sight cursor 400 are processed in accordance with one embodiment of the invention. Understanding the order in which the pixels are process will facilitate the discussion of the manner in with computer 102 of FIG. 1 generates the data necessary to display a line of sight cursor 100. The pixels associated are first processed from the selected location point 502 to edge 504 along radial 500. Once the pixels along radial 500 are processed, the pixels associated with radial 508 are processed in a similar manner from the selected location 502 to edge 504. This is followed by the processing of the pixels associated with radial 510. This process is repeated until all the pixels falling within circle 512 are processed. It should be noted that although radials 500, 508, and 510 are shown spaced some distance apart, this is only done for purposes of illustration. The actual radials are configured adjacent to each other so that each pixel within circle 512 will be processed.

Figure 6:
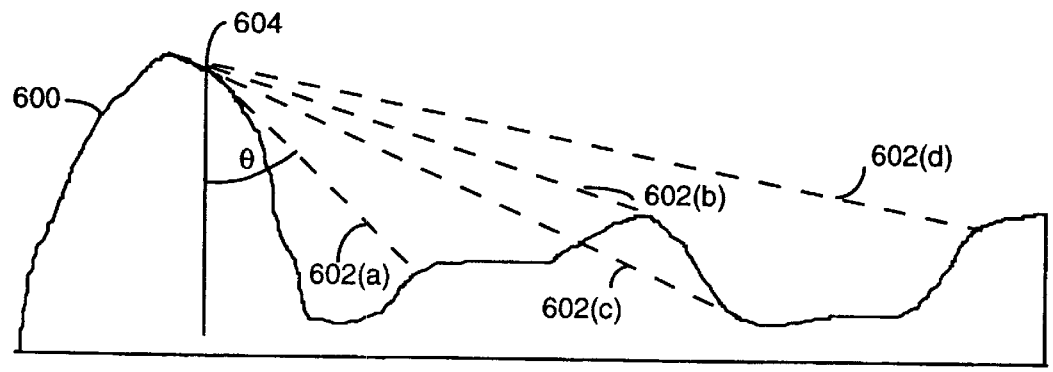
FIG. 6 is an illustration provided to illustrate the method of calculation involved with the generation of a line of sight cursor.

FIG. 6 is provided to further facilitate discussion of the various steps performed by computer 102 to generate the data necessary to display a line of sight cursor 400 in accordance with one embodiment of the invention. Curved line 600 provides a side view of a landscape. Dashed lines 602(a)-(d) represent lines drawn from selection location 604 to various locations on the landscape. Angle θ corresponds to the slope calculated with respect to each line as described above, with line 100(d) having the greatest slope, and line 100(a) having the smallest slope. As described above, processing begins at a location close to selection location 604. This processing includes the calculation of the slope of the line 602(a) from the location to the selected location. These slopes will steadily increase from, for example, the slope associated with line 602(a) to the slope associated with line 602(b). So long as the slope increases, each point is visible. As can be seen, because lines can be drawn directly from selection point 604 to both points associated with lines 602(a) and (b), indicating a direct line of sight. After processing the point associated with line 602(b), however, the slope begins to decrease as indicated by line 602(c). This causes the points associated with these slopes to be set to not visible, which as shown is proper because line 602(c) passes through some landscape indicating that the associated point cannot be seen from the selection point. Additionally, the maximum slope value is held at that of line 602(b). As the processing of the points along the radial continue, the slope increase beyond that of line 602(b) as shown by line 602(d). Once this happens, the associated locations have a direct line of sight to the select location. Line 602(d) does not pass through the landscape.

Figure 7:
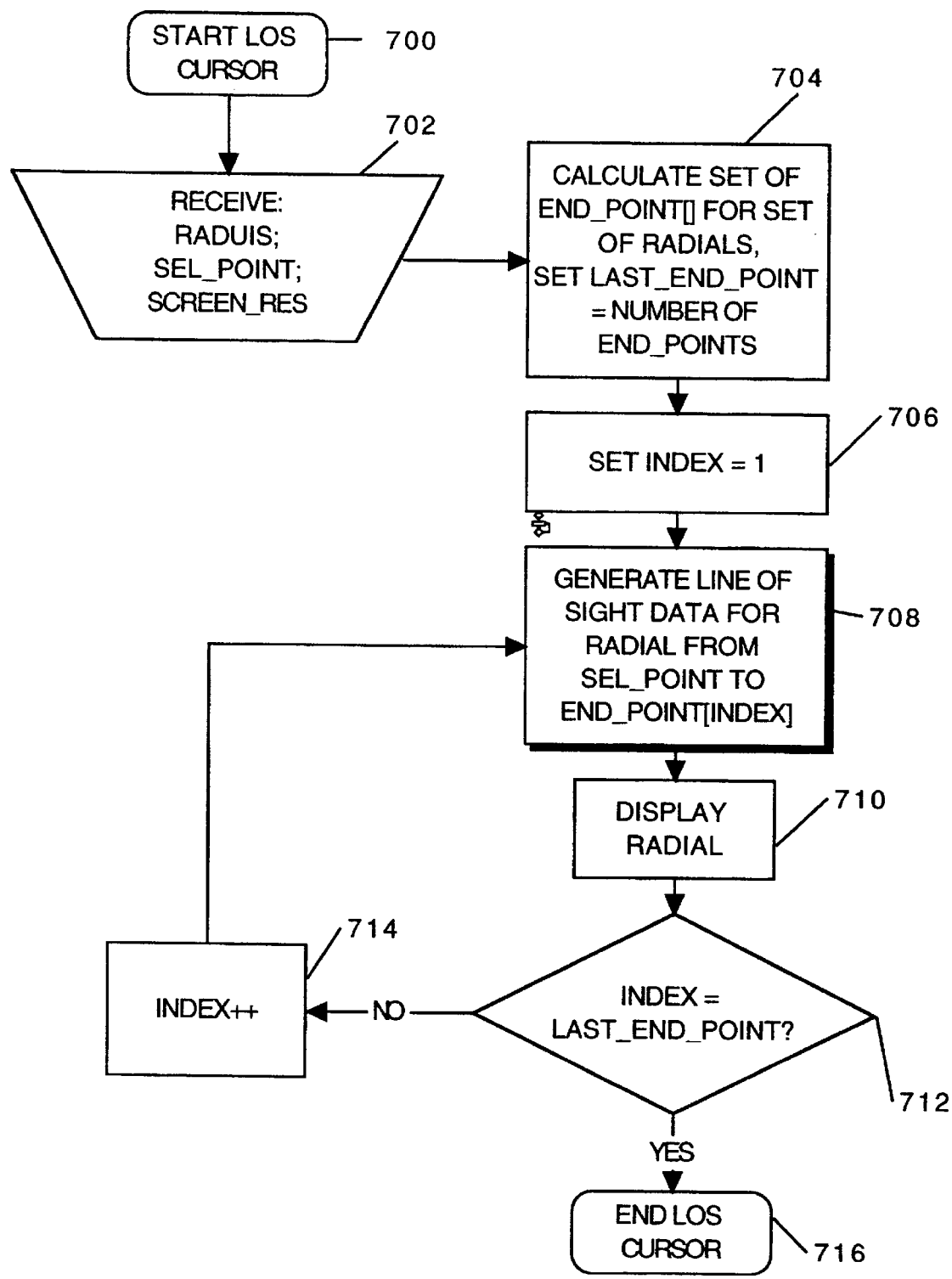
FIG. 7 is a flow diagram illustrating the steps involved with the generation of a line of sight cursor.

FIG. 7 is a flow chart illustrating the steps performed by computer 102 to generate a line of sight cursor 400 as shown in FIG. 400. The generation of the line of sight cursor begins at step 700 when a location of the screen is selected. The radius (RADIUS) of the line of sight cursor, along with the selected point (SEL_POINT) and screen resolution (SCREEN_RES) are provided at step 702. At step 704, an array of end points (END_POINT[]) are calculated. The array of end points consists of the set of pixels at the edge of a circle having radius RADIUS, and centered at the selection point. The circle is generated at the screen resolution, and therefore the set of points correspond to the set of screen pixel locations that would be set in order to display such a circle on display screen 704. Methods for calculating the set of pixels necessary to draw a circle in an X–Y coordinate system are well known in the art. Additionally, the variable LAST_END_POINT is set to the total number of points in the array END_POINT[] at step 704. At step 706, the variable INDEX is set to 1, and at step 708, line of sight data for a single radial starting at the selection point and ending at the end point END_POINT[INDEX] is generated. At step 710 the radial is displayed on display screen 104, and at step 712 it is determined whether the INDEX is equal to the last end point. If not, INDEX is incremented at step 714, an the line of sight data for another radial starting at the selection point and ending at the point END_POINT[INDEX] with the incremented index is performed. If at step 712, INDEX is equal to the last point, the cursor generation sequence is ended at step 716. Postponing the display of the cursor until all the radials have been processed is an alternative method of displaying the cursor that will be apparent to one skilled in the art.

Figure 8:
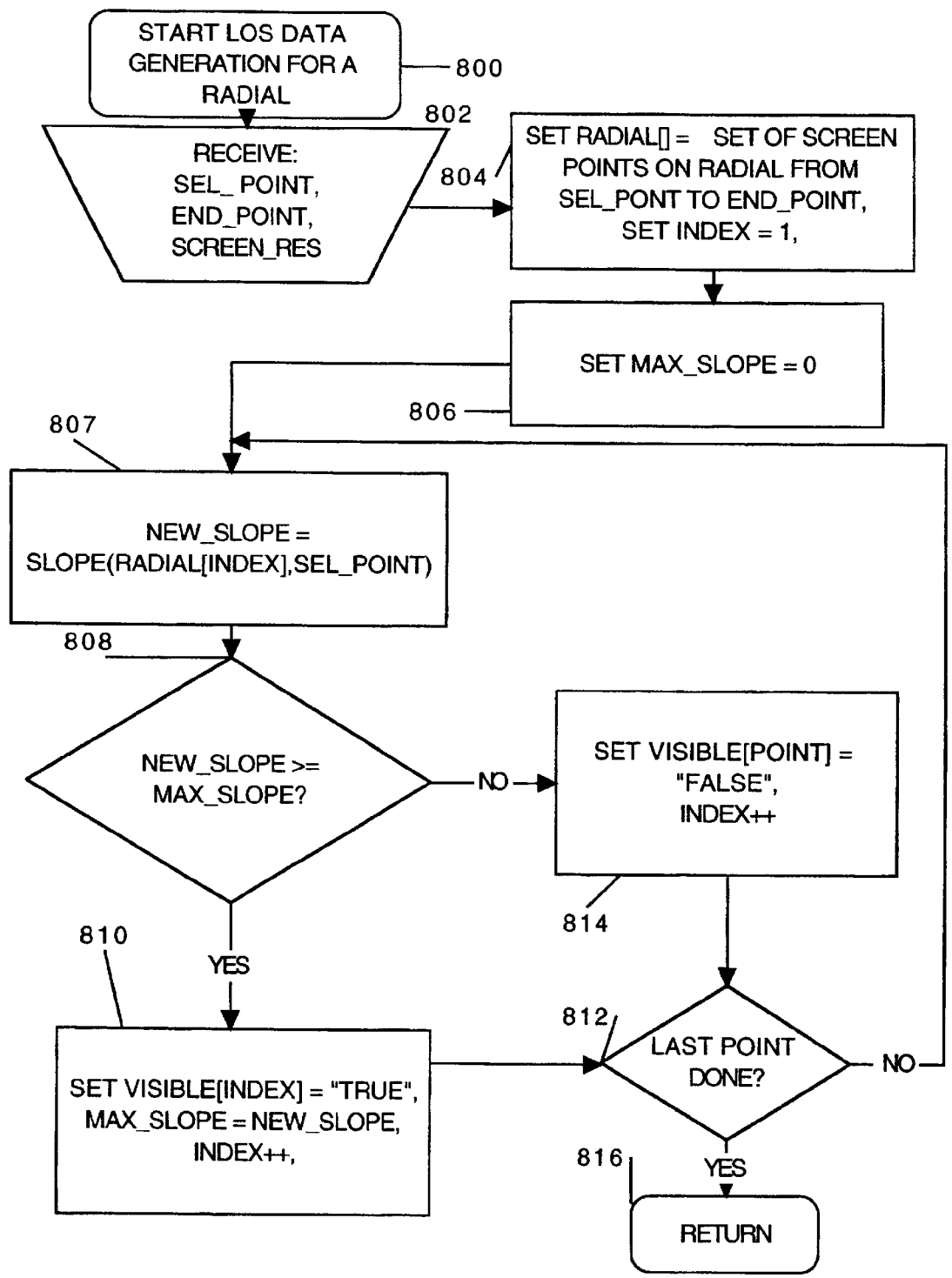
FIG. 8 is a flow diagram illustrating the steps involved with the processing of a radial of a line of sight cursor.

FIG. 8 is a flow chart illustrating the steps involved with the generation of a single radial of line of sight data as performed in step 708 of FIG. 7. The generation of the line of sight data for a radial starts at step 800, and the selection point, the end point and the screen resolution are received at step 802. At step 804, the array RADIAL[] is set to the points associated with the set of pixels on display screen 102 necessary to draw a line from the selection point to the end point. In the preferred embodiment of the invention, the set of pixels are determined in accordance with digital differential analysis the use of which is well known in the art. Additionally, the variable INDEX is set to 1. At step 806, the variable MAX_SLOPE is set to zero. At step 807 the variable NEW_SLOPE is set to the slope of a line drawn from the selection point to the point RADIAL[INDEX]. In order to determine such a slope, the function SLOPE first determines the height of the selection point, and the height of the point stored in RADIAL[INDEX]. In the preferred embodiment of this invention, the height is calculated by first establishing where the center of the pixel for both the selection point and the radial point are located, and then locating the closest bin to the center for each pixel within the data base of terrain data. Other methods of calculating the height will be apparent to one skilled in the art including taking the average of all the bins that fall under the area associated with each pixel, or taking the maximum or minimum value. The use of the value closest to the center is preferred because is requires a minimal amount of calculation.

At step 808, NEW_SLOPE is compared to MAX_SLOPE. Since this is MAX_SLOPE has been set to zero, the NEW_SLOPE will be greater and step 810 is performed. At step 810, the value at location INDEX within the array VISIBLE[] is set to "TRUE", and the variable INDEX is incremented. Additionally, the variable MAX_SLOPE to NEW_SLOPE. At step 812, it is determined if the last point in the radial has been processed, and if not step 808 is performed again. If the slope of the line from the next point in the array is less than MAX_SLOPE, step 814 is performed during which the location INDEX within array VISIBLE[] is set to "False" and the variable INDEX is incremented. Once it is determined at step 812 that the last point on the radial has been processed, the program returns at step 816. VISIBLE[] is an array associated with the array RADIAL[] that stores the state at which the associated pixel should be set when the radial is actually displayed on display screen 100 of FIG. 1. A value of true indicates the pixel should be set, and a value of false indicates the pixel should not be set. When a pixel is not set it is invisible and the underlying terrain layer shows through.

Figure 9:
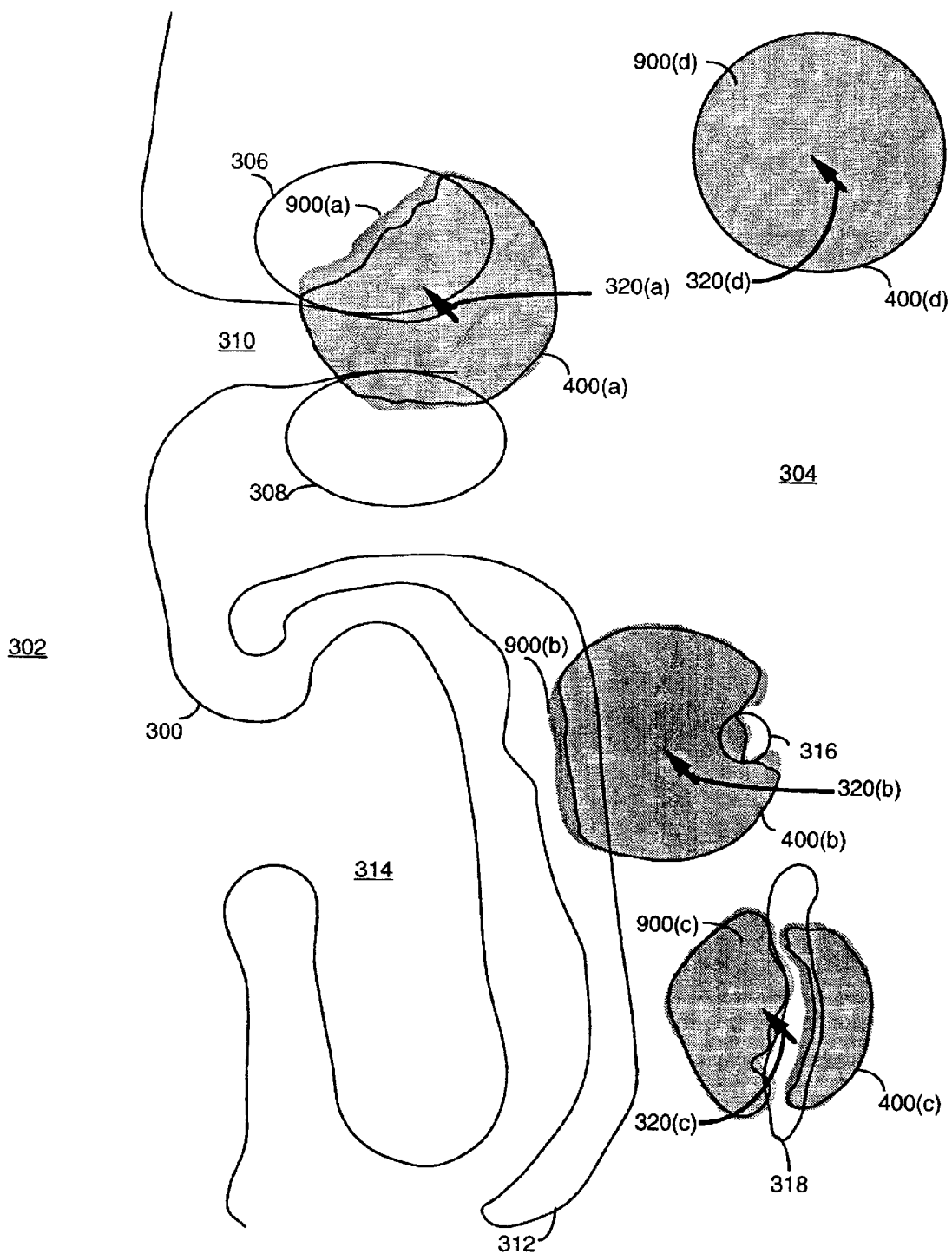
FIG. 9 is an illustration of the use of a path loss cursor in accordance with one embodiment of the invention.

FIG. 9 illustrates the images displayed in association with the use of a path loss cursor when configured in accordance with one embodiment of the invention. As is the case with the line of sight cursors 400, four path loss cursors 900(*a*)–(*c*) are shown along with four pointing cursors 320(*a*)–(*d*) in order to demonstrate the generation of the path loss cursor in four configurations. In the preferred embodiment of the invention, only one path loss cursor 900 is generated at any given time. Shown within each path loss cursor is an outline of a line of sight cursor 400(*a*) that would be generated at the locations of pointing cursors 320(*a*)–(*d*). The outlines of line of sight cursors 400 are shown in order to demonstrate the difference between path loss cursors 900 and line of sight cursors 400. In the preferred embodiment of the invention no outlines of line of sight cursors 400 are generated.

Path loss cursors 900 are generated by setting the set of pixels within a predefined radius of a selected location indicated by pointing cursors 320 that a radio frequency signal generated from the selected location would arrive with a loss below a certain threshold This differs from the line of sight cursor in that it takes into account the substantially greater refraction effect experienced by radio frequency signal when compared to visible light signals. The result of the refraction is that a greater number of locations within a given radius can receive a radio frequency signal generated from the selection point, and therefore path loss cursors tend to be larger than the line of sight cursors. This is illustrated by the outline of the line of sight cursors 400 which fall within path loss cursors 900. Additionally, in the preferred embodiment of the invention an antenna height is added to the height of the selected point and point being processed during calculation of path loss cursor 900. Different embodiments of the invention may choose to either set each pixel to the same color or value, or to set the set of pixels to various colors or values based on the amount of loss a radio frequency signal will experience before arriving at the particular location associated with a pixel.

Figure 10:
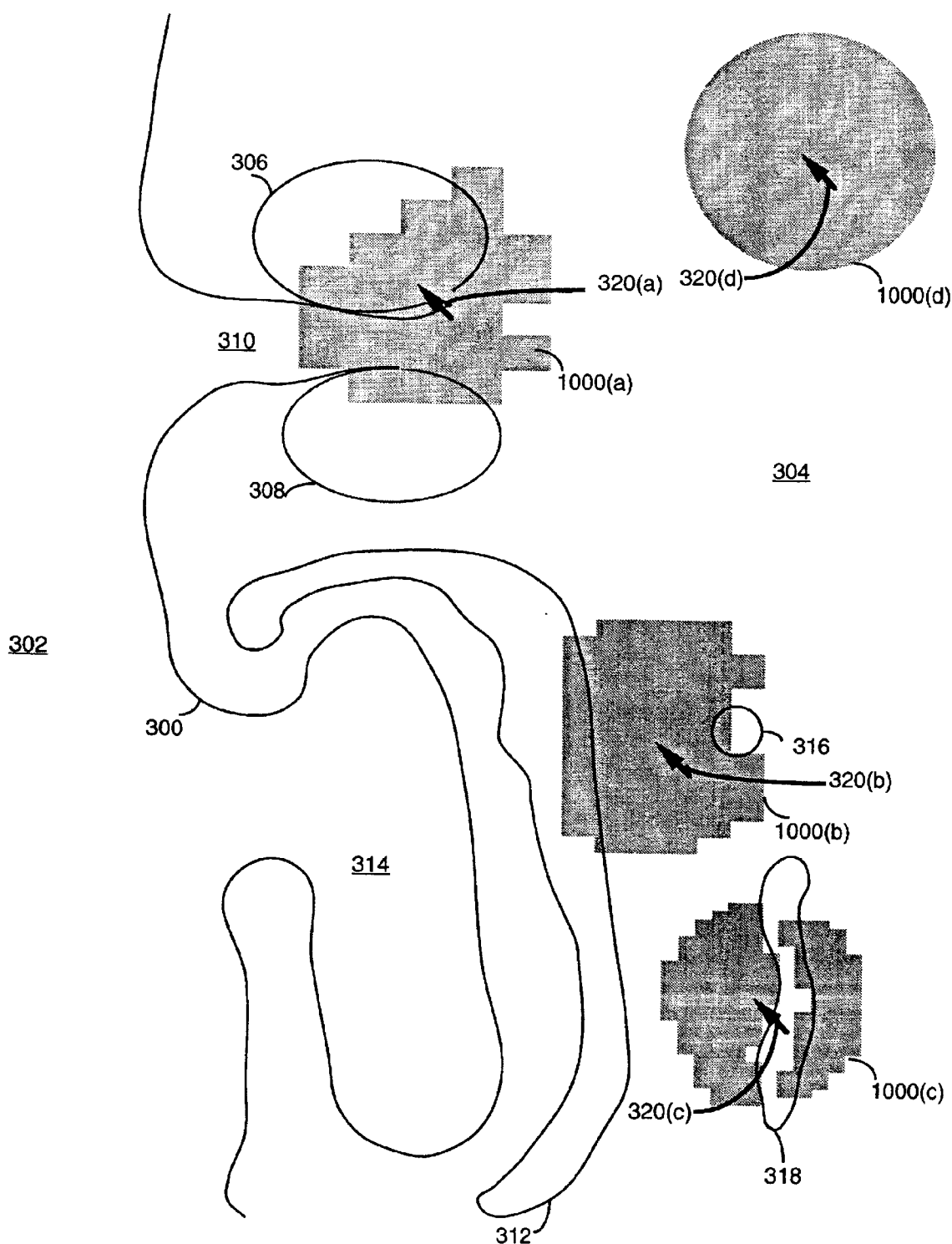
FIG. 10 is an illustration of the various states of generation of a path loss cursor in accordance with one embodiment of the invention.

FIG. 10. is an illustration of four path loss cursors 1000 in various states of generation in accordance with one embodiment of the invention. The computations and calculation involved with the generation of the information necessary to generate a path loss cursor are far greater than that required to generate a line of sight cursor. The calculations are also sufficiently complex to require as much as a few seconds of calculation time for the standard computer workstation. Path loss cursors 1000(*a*)–(*d*) illustrate the various steps involved in the generation of a path loss cursor so that a user of the network planning tool will not have to wait until the cursor can be completely generated in order to receive feedback regarding selected location.

Path loss cursor 1000(*a*) is an example of the initial image generated in response to the selection of the location indicated by pointing cursor 320(*a*). As can be seen, the cursor is comprised of a set of blocks the pixels within which are all set. The blocks provide an indication of the locations that will receive radio frequency signals transmitted from the selected location based on an initial set of calculations performed by computer 102. These initial calculations only provide a low resolution estimate of the actual set of locations, but can be performed in a relatively rapid fashion. Thus, path loss cursor 1000(*a*) can be generated almost instantaneously providing the computer user with immediate feedback regarding the path loss associated with the selected location.

Path loss cursor 1000(*b*) is an example of the image generated after additional time has passed with respect to the generation of an image like that of path loss cursor 1000(*a*). As can be seen the blocks of pixels used to generate the image are smaller than those used to generate path loss cursor 1000(*a*). The blocks of pixels are smaller, and therefore higher resolution is provided because additional calculations can be performed during the additional time that has expired from the selection of the location indicated by pointing cursor 320(*a*). Path loss cursor 1000(*c*) illustrates the image associated with the passage of even a greater amount of time than that associated with path loss cursor 1000(*b*). As can be seen the image is comprised of blocks of pixels that are even smaller than those used to generated path loss cursor 1000(*b*) and therefore path loss cursor 1000(*c*) is of even higher resolution. Path loss cursor 1000(*d*) is an example of the completed image generated after sufficient time has passed to allow sufficient calculation to be performed to generate an image with resolution equal to that of the capabilities of data screen 104, or of that allowed by the available terrain data. This method of implementing the path loss cursor 1000 allows immediate response to be provided to the user, while also allowing high resolution to be provided if the user is willing to wait a slightly longer period of time.

Figure 11:
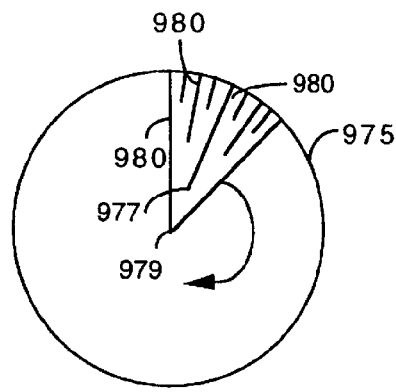
FIG. 11 is an illustration of the order in which the data associated with a path loss cursor are processed.

FIG. 11 illustrates the order of processing of the various locations within the path loss cursor in accordance with one embodiment of the invention. Circle 975 defines the area for which the data associated with the path loss cursor will be generated. Radials 980 protrude outwardly from selection point 979 in a similar manner to those of the line of sight cursor, but some do not completely span the distance from the selection point 979 to circle 975. Not all the radials span that distance because the locations associated with each radial are not processed closer to the selection point because fewer pixels are available or necessary for displaying the additional locations. Therefore, fewer locations are necessary to achieve the same density and resolution and in order to avoid unnecessary processing, only a portion of the locations associated with radials that do not fall along even multiples of 45 degree angles are processed. The use of this method for selecting locations for processing is referred to as variable rate selection. The location of a particular radial determines is referred to as its rank, with radials located on the major 45 degree lines being of "rank" 1, and those radials falling on angles that are fractions thereof being higher rank, and therefore shorter in length. The generation of a radial is started at some point before the separation of the radials of lower rank becomes greater than twice the resolution at which the cursor is generated, the exact amount for which can be determined by experimentation.

Figure 12:
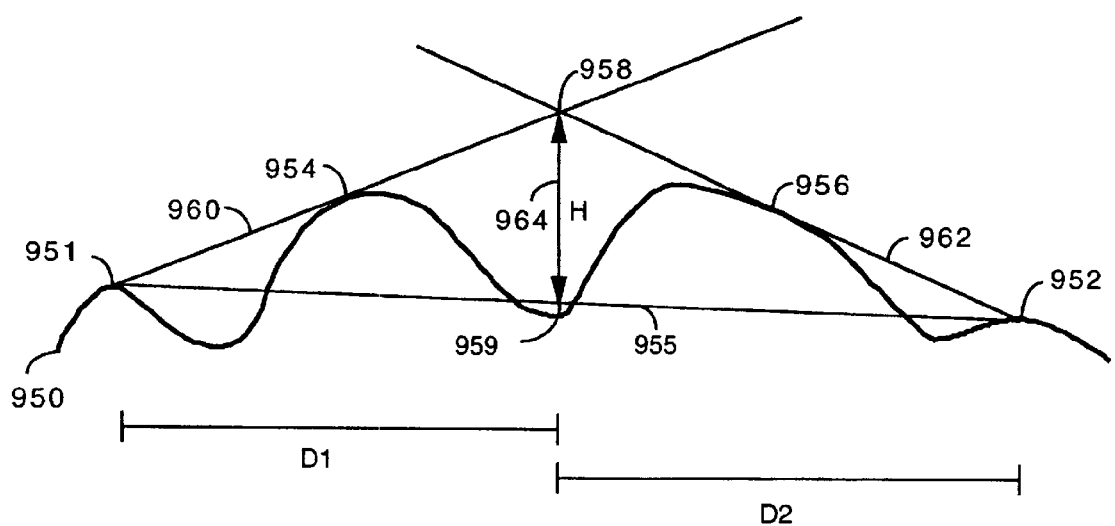
FIG. 12 is an illustration provided to illustrate the method of calculation involved with the generation of a path loss cursor.

FIG. 12 is a side view of a hypothetical landscape provided to illustrated the calculation of the path loss associated with a point on a radial that does not have a direct line of sight to the selected location. Line 950 represents the side view of the landscape on which selected point 951 and point 952 being processed are located. First edge 954 is the point highest on the landscape in view of center point 951 (i.e. the point on landscape 950 from which a line drawn to selected point 951 has the highest slope), and last edge 956 is the highest point on the landscape in view of point 952. First edge 954 and last edge 956 are identified by determining the locations on landscape 950 from which lines 960 and 962 drawn to selected point 951 and point 952, respectively, have the greatest slope in accordance with the calculation of such slopes as described for the line of sight cursor provided above. To calculate the path loss, location 958 where line 960 and line 962 intersect is first identified and a line 955 drawn from selected point 951 to point 952 is generated. Using point 958 and line 955, a height H is set to correspond to minus the length of line 964 drawn directly downward from point 958 to point 959 on line 955, and distance D1 from point 951 to point 959 and distance D2 from point 959 to point 952 are determined. Using location distances H, D1 and D2, which were calculated using selected point 951, first edge 954, last edge 962, and point 952, the path loss is calculated as follows:

$$v = H \times \sqrt{\frac{2}{\lambda} \times \left[\frac{1}{D_1} \times \frac{1}{D_2}\right]} \quad (1)$$

Where H is a negative number and:

$$\text{If } v < -2.4, \quad \text{loss} = -20 \times \log_{10}(-0.225/v) \quad (2)$$

$$\text{If } -24 < v < -10.0, \quad (3)$$
$$\text{loss} = -2 - \times \log_{10}\left[0.4 - \sqrt{0.1184 - (0.1v + 0.38)^2}\right]$$

$$\text{If } -1.0 < v < 0.0, \quad \text{loss} = -20 \times \log_{10}[0.5 \times e^{0.92v}] \quad (4)$$

Those skilled in the art will recognize the above provided calculation as a standard path loss equation well known in the art. If only one edge exists between selected point 951 and location being processed 952, H is set to minus the distance of that edge to line 955. For locations having a direct line of sight to the selected location, a distance based line of sight calculation is as follows:

loss=A+BlogD

Where D is the distance on the ground from point 951 to point 952, and A and B are set according to various well known techniques well known in the art depending on the type of market area being simulated. That is, urban, suburban, many trees etc.

Various other methods of calculating the path loss between two point that either have or do not have direct line of sight view to the selected location will be apparent to one skilled in the art. The methods of calculation provided above are merely one example of performing such calculations, and the use of these other methods are constant with the operation of the present invention. However, the methods of calculation provided above are especially useful in that they provide an ideal level of accuracy for display on a typical computer display screen while consuming a minimal amount of computer resources and development time.

Figure 13:
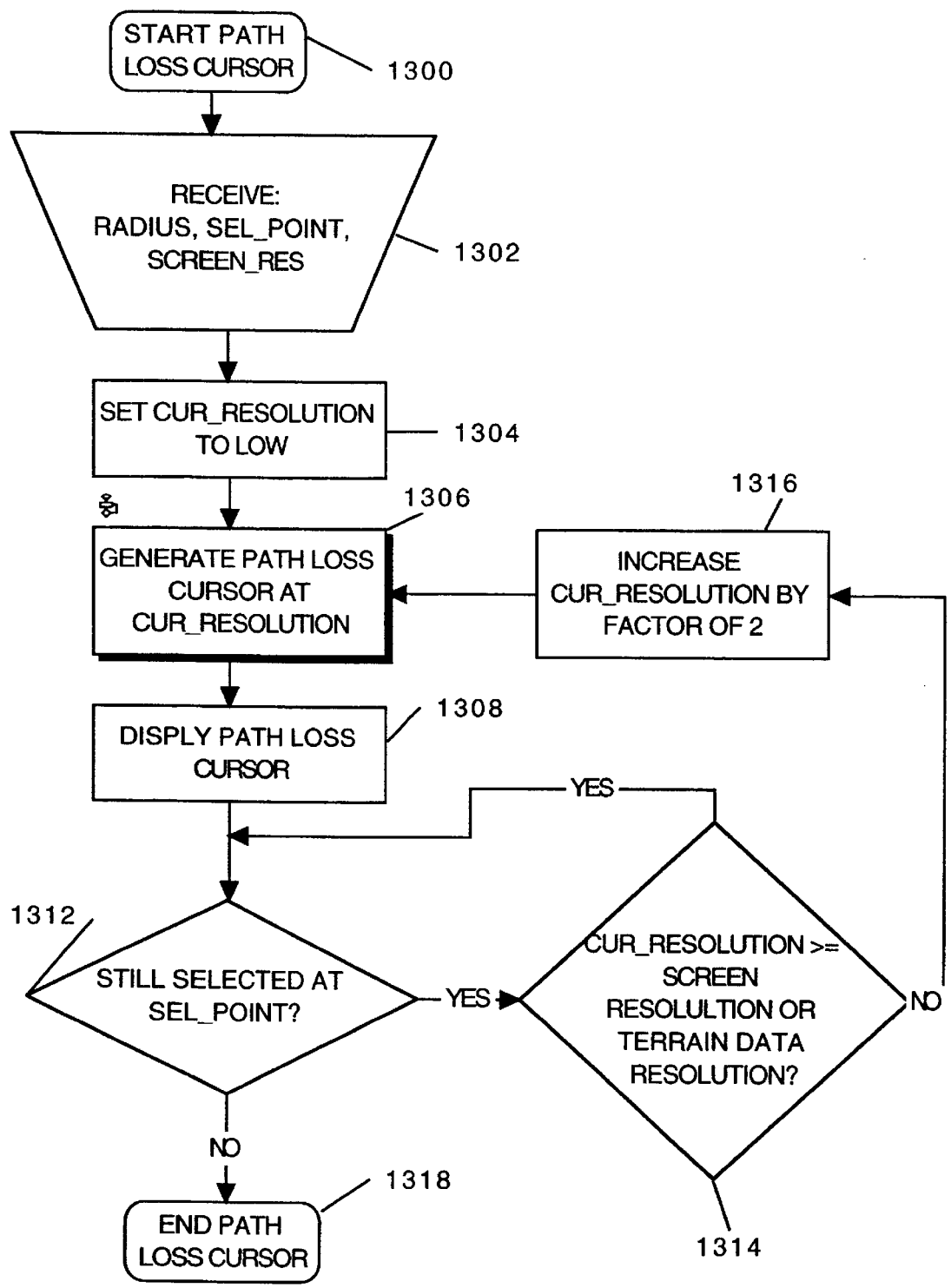
FIG. 13 is a flow diagram illustrating the steps involved with the generation of a path loss cursor.

FIG. 13 is a flow chart illustrated the steps performed by computer 102 during the generation of a path loss cursor 900 (or 1300) in accordance with one embodiment of the invention. Once the path loss cursor tool has been selected, and the selection point selected, the generation of the path loss cursor begins at step 1300. At step 1302, the selection point (SEL_POINT), radius (RADIUS), and screen resolution (SCREEN_RES) are received. At step 1304, the cursor resolution is set to a low value such that the resolution of the path loss cursor when first generated will be low like that of path loss cursor 900(a) of FIG. 9. At step 1306, the path loss cursor is generated at the resolution specific by variable CUR_RESOLUTION, and at step 1308 the path loss cursor is displayed on display screen 132. At step 1312, it is determined if the same selection point remains selected, and if so step 1314 is performed. At step 1314 it is determined if the path loss cursor resolution is greater than or the screen resolution, and if so the cursor resolution is increased at step 1316 and the path loss cursor is generated again. If the cursor resolution is greater than or equal to the screen resolution, step 1310 is performed again. If at step 1312 the selected point is no longer selected, the generation of the path loss cursor is terminated at step 1318.

Figure 14:
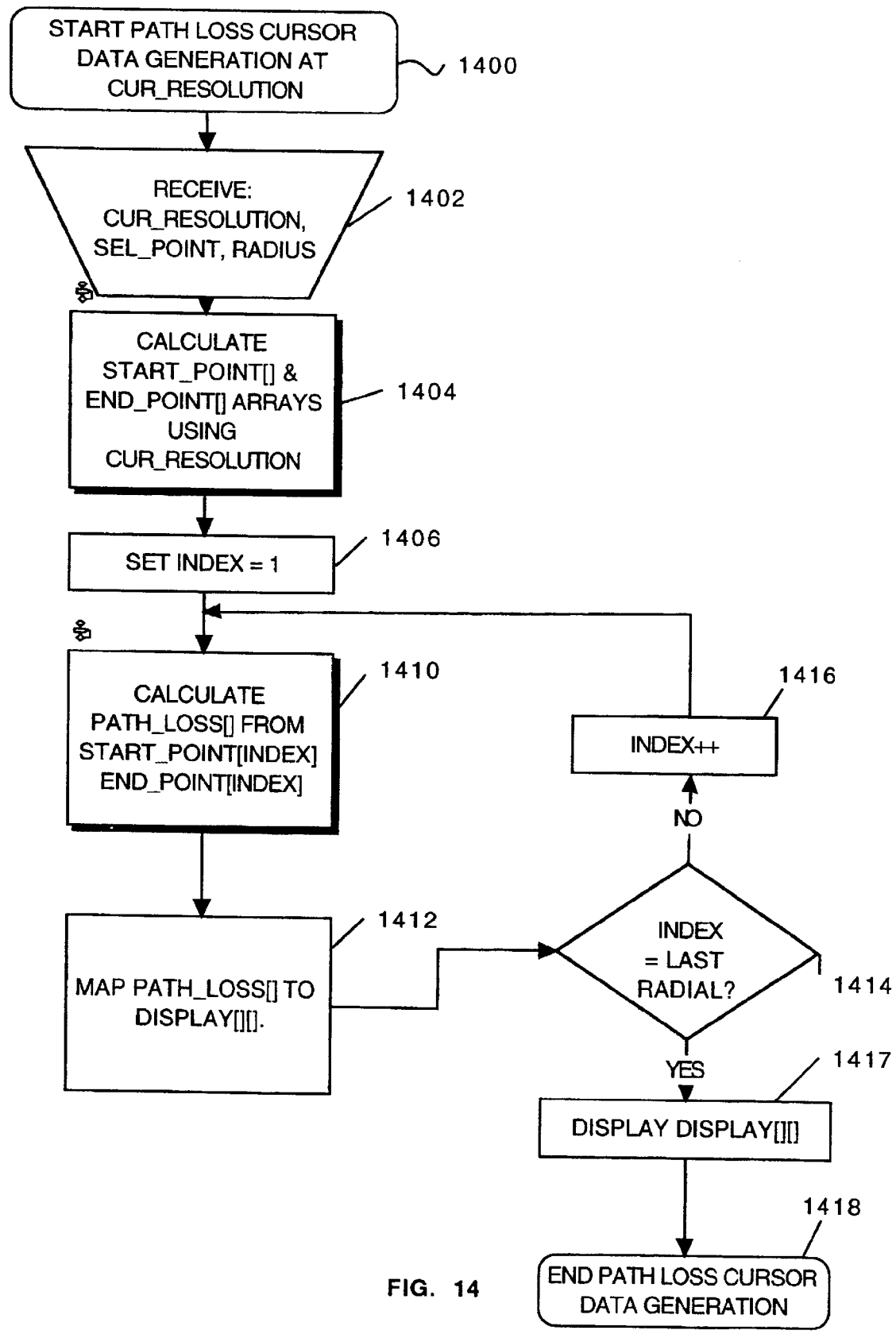
FIG. 14 is a flow diagram illustrating the steps involved with the generation of a path loss cursor at one resolution.

FIG. 14 is a flow chart of the steps involved in the generation of the data associated with a path loss cursor at a particular resolution as performed in step 1306 of FIG. 13. The generation of the data associated with a path loss cursor begins at step 1400 and the cursor resolution, center point, and radius are received at step 1402. At step 1404, a set of start points and corresponding end points for the set of radials used to generated the path loss cursor are calculated in accordance with variable rate selection techniques described above with respect to FIG. 11. The calculation of these two sets of points is discussed in more detail below in conjunction with FIG. 15. At step 1406, the local variable INDEX is set to 1, and at step 1408 a set of points are generated associated with a radial defined by the points specified at location INDEX within the START_POINT and END_POINT arrays. The set of points are also determined by the resolution at which the path loss cursor is to be generated. Using this set of points the path loss associated with each point in the array RADIAL[] is calculated and stored in the array PATH_LOSS[] at step 1410. At step 1412 each path loss value is mapped onto the display screen by setting the appropriate set of pixel locations in array DISPLAY[][] depending on the location, whether the path loss is above or below a specified threshold value and the resolution of the cursor being generated. As noted above, the pixels could be set to various colors depending on the amount of path loss. At step 1414 it is determined whether the last radial has been processed and if not the variable INDEX is incremented at step 1416 and the next radial is processed. Otherwise the data in array DISPLAY[][] is displayed on display screen 100 and generation of the data for a path loss cursor at a particular resolution is terminated at step 1418.

Figure 15:
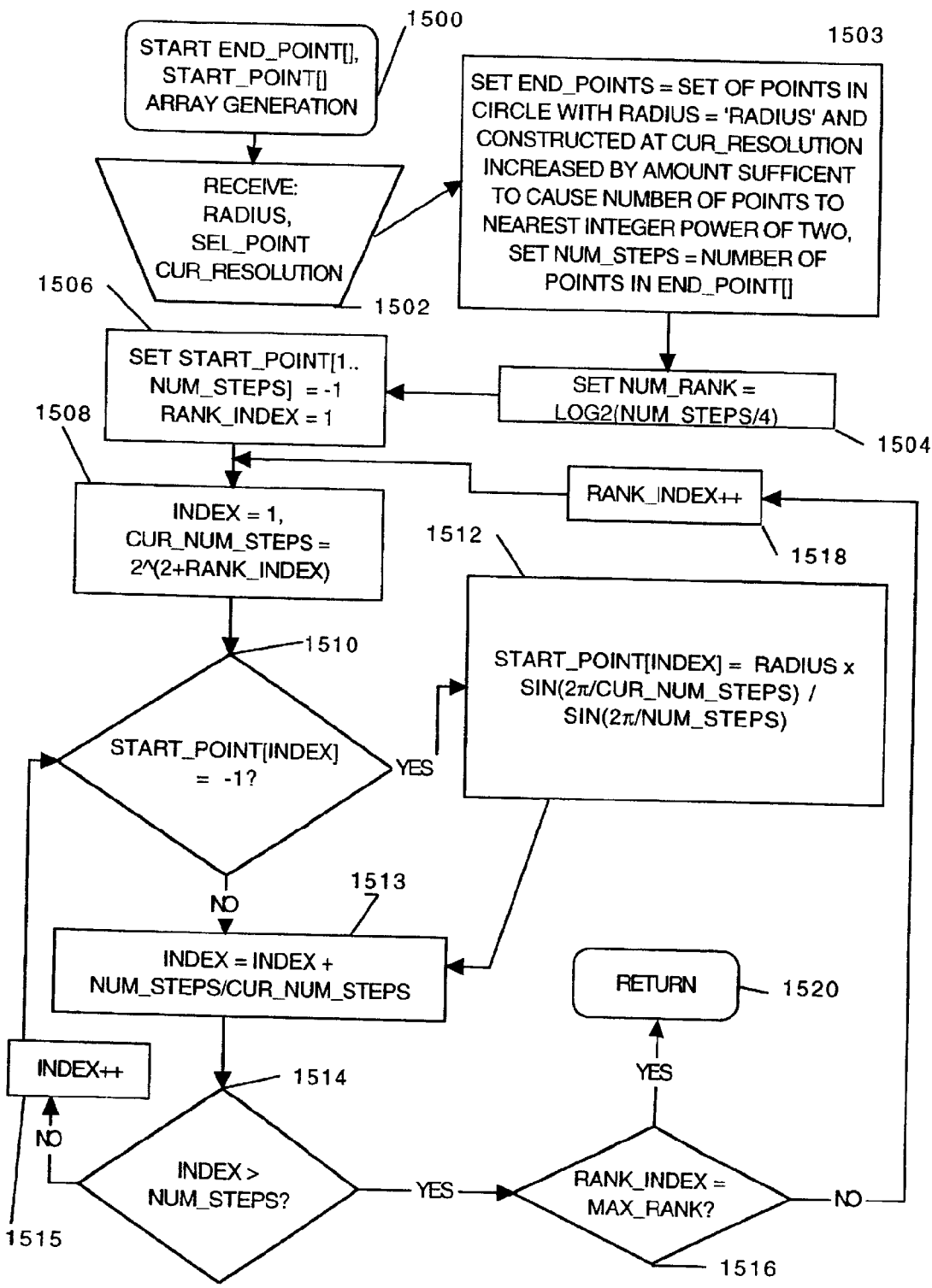
FIG. 15 is a flow diagram illustrating the steps involved with the generation of a set of radials processed to generate a path loss cursor at a given resolution.

FIG. 15 is a flow chart illustrating the steps involved with the generation of START_POINT[] and END_POINT[] arrays as performed in step 1404 of FIG. 14 in accordance with on embodiment of the invention. The points stored in these array are the start points and end points for the set of radials generated in accordance with the variable rate selection procedure described above with respect to FIG. 11. The generation of the START_POINT[] and END_POINT[] arrays begins at step 1500 and at step 1502 the radius, selection point and cursor resolution are received. At step 1503 the array END_POINT[] is set to the set of points associated with a circle around the selection point having radius equal to the value stored in the variable RADIUS increased by an amount necessary to cause the number of point in array END_POINT[] to be an integer power of two. Additionally, the variable NUM_STEPS is set to the number of points in array END_POINT[] and therefore also to an integer power of two. At step 1504, the variable NUM_RANK is set to the log base 2 of the number of steps divided by four. At step 1506 the points within array START_POINT are initialized to −1, and the variable RANK_INDEX is set to 1. At step 1506 the variable INDEX is set to 1, and the variable CUR_NUM_STEPS is set to two raised by the value (2+RANK_INDEX). The variable CUR_NUM_STEPS equals the number of radials in the path loss cursor having the rank equal to the value stored in rank index.

At step 1510 it is determined if −1 is stored in the location INDEX within array START_POINT[]. If so, the location INDEX with array START_POINT[] is set to the selection point plus the variable RADIUS times the sin of $2\pi$ divided by CUR_NUM_STEPS and divided by the sin of $2\pi$ divided by NUM_STEPS. Thus, if RANK_INDEX is equal to one the length of the radial will be and entire radius as expected. If START_POINT[INDEX] is not equal to −1 at step 1510 step 1512 is bypassed. At step 1513 the variable INDEX increased by the value NUM_STEPS/CUR_NUM_STEPS, thus increasing INDEX by an amount equivalent to forty five degrees when RANK_INDEX is equal to one. If at step 1514 INDEX is greater than NUM_STEPS the variable INDEX is incremented at step 1515 and step 1510 is performed again. Otherwise, at step 1516 it is determined whether RANK_INDEX is equal to MAX_RANK, and if not RANK_INDEX is incremented at step 1518 and step 1508 is performed again. If at step 1516 RANK_INDEX is equal to MAX_RANK the generation of the START_POINT[] and END_POINT arrays is terminated at step 1520.

Figure 16:
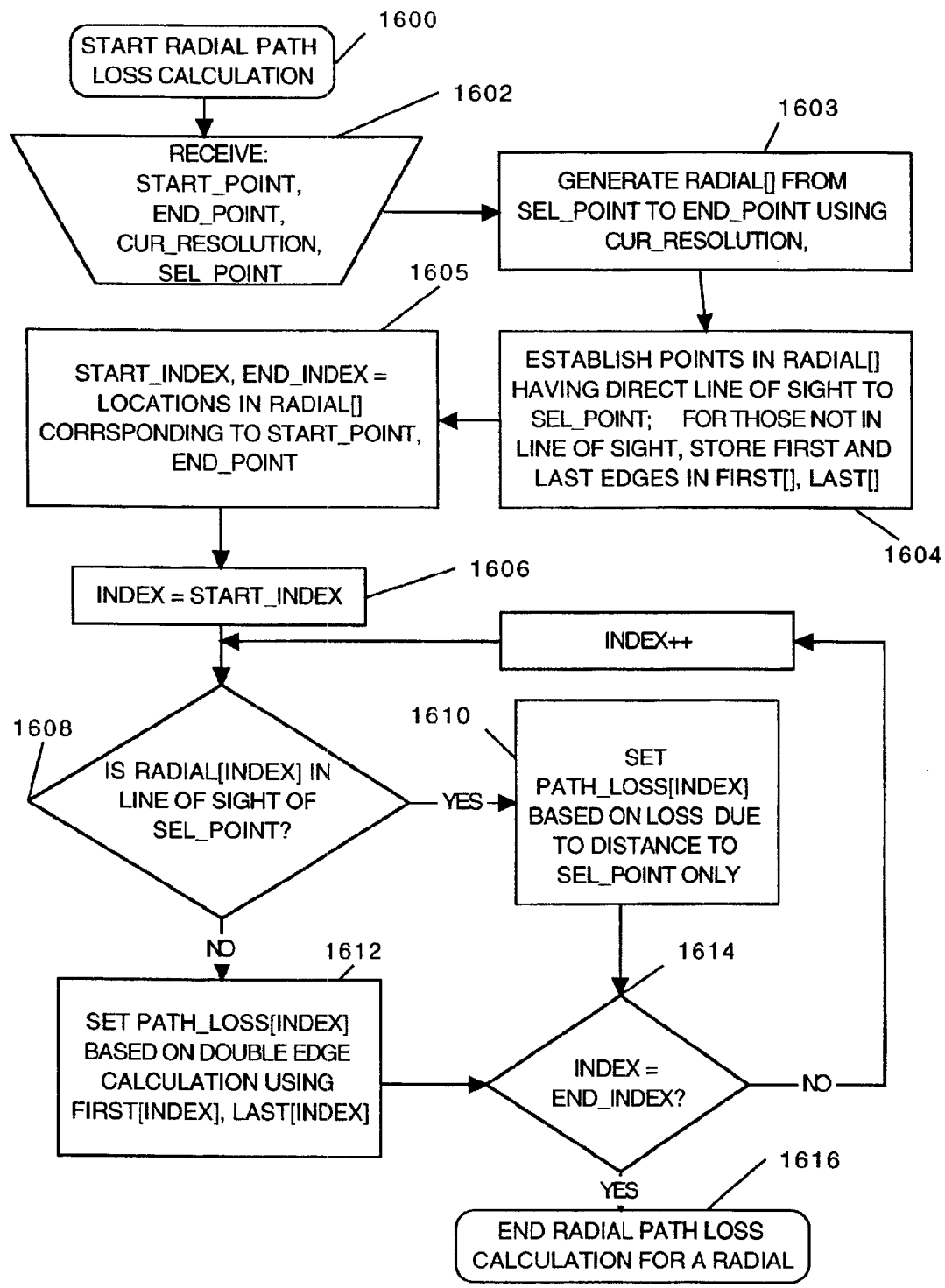
FIG. 16 is a flow diagram illustrating the steps involved with the processing of a set of radials of a path loss cursor at a given resolution.

FIG. 16 is a flow chart illustrated the steps involved with the calculation of a radial of path loss data at performed in step 1110 of FIG. 11 in accordance with on embodiment of the invention. The calculation of the path loss data associated with a particular radius begins at step 1600 and at step 1602 the start point and end point associated with the calculation are received, as well as the cursor resolution and the selection point. At step 1603 a set of points associated with the radial from the selection point to the end point spaced according to the cursor resolution are generated and stored in array RADIAL[]. At step 1604 those points within radial that have a direct line of sight to the selection point are determined, and for those points that do not have a direct line of sight the first and last edges are identified and stored in arrays FIRST[] and LAST[]. At step 1605 the variables START_INDEX and END_INDEX are set to the index values within array RADIAL corresponding to the points START_POINT and END_POINT. At step 1606 the local variable INDEX is set to the value START_INDEX and at step 1608 it is determined whether the point RADIAL[INDEX] has direct line of sight to the selection point using the data generated at step 1604. By setting the local variable INDEX to START_INDEX the total number of points processed will be reduced because all of the points on the radial are not processed. If the point RADIAL[INDEX] has a direct line of sight to the selection point, the path loss is calculated at step 1610 using the direct line of sight formula as described above. If the point does not have a direct line of to the selection point, the path loss is calculated using the first and last edge formula at step 1612, where the double edge path loss formulas is also described above. Following either step 1610 or step 1612, it is determined at step 1614 whether the local variable INDEX is equal to the value END_INDEX, and therefore the last point in the radial has been processed, and if not the local variable INDEX is incremented and step 1608 is performed again. If the last point in the radial has been processed, the calculation of the path loss data for the radial is terminated at step 1616.

A line of sight analysis method and a path loss analysis method are two exemplary embodiments of the present invention in which a network designer may interactively display useful information for planning a wireless network. The line of sight method enables the network designer to visually see where a physical obstruction is blocking a signal route from the base station to a subscriber unit in a highly interactive and real time manner. Similarly, the path loss display enables the designer to visualize where signal strength has diminished to the point where transmission is no longer possible. It should be noted that analysis results using the present invention are provided in substantially real-time. In general, the present invention contemplates that an interactive graphical interface benefits all wireless communication analysis methods because the results are graphically displayed and immediately available, and to allow the rapid change of parameters to test a wide variety of placements for wireless network systems.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method for allowing evaluation of a placement location of a base station for a wireless telephone system comprising:
   (a) storing a set of elevations associated with a region over which the wireless telephone system will be implemented;
   (b) displaying said region on a display system;
   (c) receiving said placement location;
   (d) calculating a set of line of sight locations within a portion of said region from which said placement location can be seen wherein said portion of said region is substantially smaller than said region by
      (d.1) calculating a first slope from the placement location to a first location proximate to said placement location;
      (d.2) calculating a second slope from the first location to a second location located radially outward from said placement location; and
      (d.3) placing said second location in said set of line of sight locations if said second slope is less than said first slope; and (e) displaying said set of line of sight locations and said region.

2. The method as set forth in claim 1 wherein step (c) is comprised of the steps of:
   (c.1) receiving positioning signals via a positioning device; and
   (c.2) receiving a selection signal via said positioning device.

3. The method as set forth in claim 2 wherein said positioning device is a mouse.

4. The method as set forth in claim 1 further comprising the step of:
   converting an x–y coordinate to a polar coordinate.

5. A method for indicating the suitability of a placement location for transmitting and receiving radio frequency signals comprising the steps of:
   (a) generating data indicative of the ability of a radio frequency signal to be transmitted between said placement location and a set of surrounding locations within a geographical region, wherein said set of surrounding locations are much smaller than said geographical region by
      (a.1) determining if each location in said set of surrounding locations has a direct line of sight view to said placement location by
         (a.1.1) determining a set of points along a line from said placement location to and end point;
         (a.1.2) determining whether each point in said set of points has a line of sight view to said placement location by calculating a first slope of a first line from said placement location to a first point in said set of points that is closest to said location; calculating a second slope of a second line from said placement location a second point in said set of points that is closest to said first location; and
   setting said second point to visible if said second slope is greater than said first slope, and to not visible if said second slope is less than first slope; and
   (b) displaying said data within said geographical region on a display screen of a computer system.

6. The method as set forth in claim 5 wherein step (a) is comprised of the step of:
   (a.1) determining a path loss amount with respect to said location for each location in said set of locations.

7. The method as set forth in claim 6 wherein step (a.1) is comprised of the steps of:
   calculating a set of points along a line from said placement location to an end point;
   determining whether each point in said set of points has a direct line of sight to said placement location;
   recording a first edge and a second edge for each of said set of points that does not have a direct line of sight view of said placement location;
   calculating said path loss amount using a direct line of sight path loss formula for each point in said set of points having a direct line of sight view to said placement location; and
   calculating said path loss amount using a knife edge formula for each point in said set of points not having a direct line of sight view to said placement location.

* * * * *